Nov. 14, 1939.    F. D. CLARKE    2,180,222

SPOOL AND CONTAINER FOR SENSITIZED FILM OR PAPER

Filed Nov. 26, 1937

INVENTOR.
FREDRICK D CLARKE
BY
Philip S. Hopkins.
ATTORNEY

Patented Nov. 14, 1939

2,180,222

UNITED STATES PATENT OFFICE 2,180,222

SPOOL AND CONTAINER FOR SENSITIZED FILM OR PAPER

Fredrick D. Clarke, Binghamton, N. Y., assignor, by mesne assignments, to Agfa Ansco Corporation, Binghamton, N. Y., a corporation of Delaware Application November 26, 1937, Serial No. 176,555

6 Claims. (Cl. 206—52)

This invention relates to a spool and container for sensitized film or paper.

A primary object of this invention is the provision of an improved spool of a simplified construction and a container therefor adapted to be utilized in conjunction with the spool whereby the sensitized film or paper may be loaded into or removed from a photographic camera or copying mechanism in the presence of light.

An additional object is the provision of such a spool and container which may be utilized a large number of times, the arrangement being such that loading the spool with film or paper and enclosing the same in the container or removing the sensitized material from the container and spool has no lasting effect on the component parts of the spool and container.

As conducive to a clearer understanding of this invention, it may here be pointed out that certain photographic mechanisms must, of necessity, be loaded with film or paper and the same removed therefrom in the presence of light. As illustrative, certain photographic mechanisms designed to be utilized out of doors are of such bulk as to render the removal of the entire mechanisms to a dark room for loading or unloading a difficult process. In such cases it is desirable that the sensitized roll be contained in a casing, the spool and casing being arranged in such manner that they may be inserted in the photographic mechanism as an integral unit and removed therefrom in the same condition. Containers for spools adapted to protect the film or paper during insertion and removal from such a photographic mechanism have hitherto been known but they have been, comparatively speaking, uniformly complicated of assembly and have had the disadvantage that in the majority of instances, they have been adapted to be utilized only once, removal from the container or from the spool damaging the parts in such manner as to render their reuse impossible. It is an object of this invention, therefore, to provide a spool and container of such character, which is simple and relatively inexpensive of construction and which may be utilized a large number of times without damage to the spool or the container occasioned by the winding of the material thereon or the removal of the material therefrom.

Figure 1:
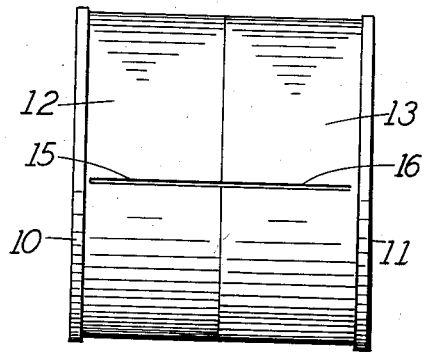
Figure 2:
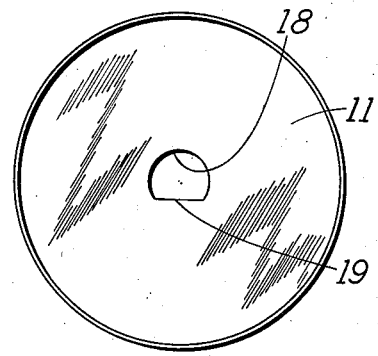
Figure 3:
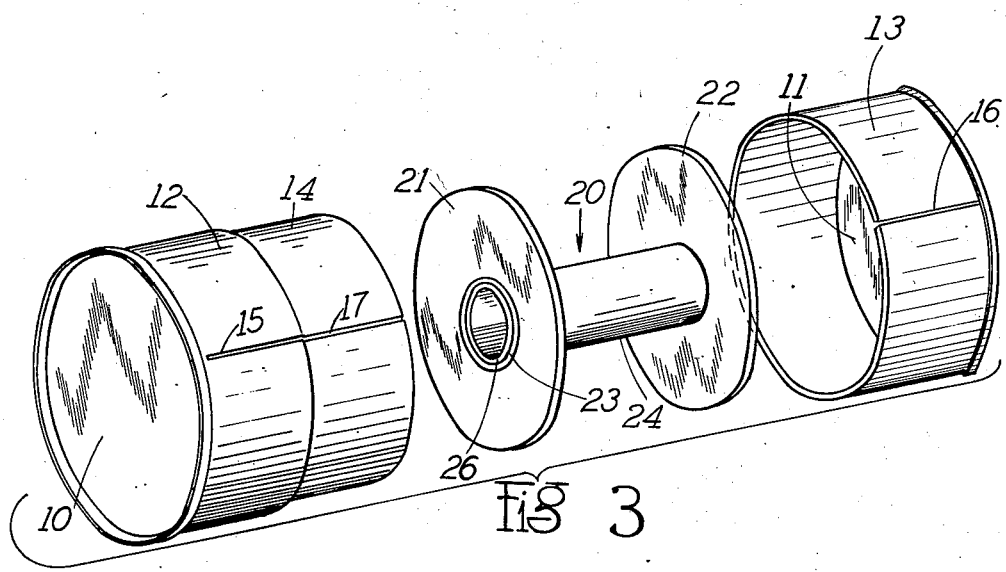
Figure 4:
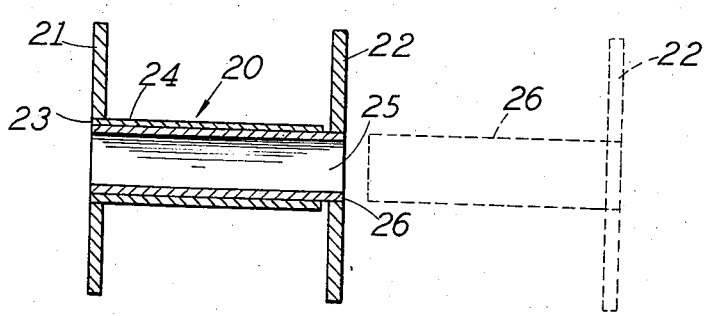

The invention accordingly consists in the combinations of elements, arrangements of parts and features of construction all as will be more fully pointed out hereinafter and disclosed in the accompanying drawing wherein:

Figure 1 is a side elevational view of one form of container comprising a portion of the instant invention, Figure 2 is an end elevational view of the device of Figure 1 as viewed from the right, Figure 3 is an exploded perspective view (in brackets) of the container and spool, and Figure 4 is a sectional view of one form of spool comprising a portion of this invention.

Similar reference characters refer to similar parts throughout the several views of the drawing.

Inasmuch as the spool and container herein shown and described are adaptable for use with either sensitized film or paper, it will, for brevity, be hereafter referred to as a "film" spool and container. It will be understood, however, that the invention is of wide application and is not restricted to film or to sensitized material.

Having reference first to the container for the film spool, it will be seen that the same comprises two end portions 10 and 11 which may be comprised of any suitable substance such as sheet metal. Secured to end portion 10 in any desired manner is sleeve 12 which may be comprised of cardboard or other desired material.

Similarly secured to end portion 11 is a sleeve 13 substantially identical in diameter and length to sleeve 12. Positioned within sleeve 12 is a second sleeve 14 of a diameter to fit tightly within sleeve 12 and, when the parts are in related assembly, similarly within sleeve 13. Sleeve 14 may if desired be secured to end portion 10 or may be held in related assembly with sleeve 12 solely by frictional engagement therewith. Sleeve 14 is substantially equal in length to the combined length of sleeves 12 and 13, to provide in effect a double walled container when the parts are in related assembly.

Each of sleeves 12, 13 and 14 is provided with a tapered slot, 15, 16 and 17 respectively, each of which slots extends substantially the entire length of its associated sleeve. Thus when the sleeves are assembled in the manner shown in Figure 1 and the container closed the alignment of slots 15, 16 and 17 provides substantially a single slot through which an end of the film positioned in the container, in a manner to be hereinafter described, may be passed.

End portion 11 is provided with an aperture 18 having a flattened portion 19 through which may be passed any suitable axle member (not shown) having a corresponding flat side for supporting the film container in a desired relationship with a photographic mechanism in such manner that the same is nonrotatably secured in predetermined position.

A film spool generally indicated at 20 is adapted to be positioned within the container. Spool 20 comprises a pair of end flanges 21 and 22 of substantially identical diameter. End flanges 21 and 22 may be of any desired material although heavy cardboard and sheet metal have been found desirable for the purpose. Flange 21 is provided with a centrally disposed aperture 23 to the interior periphery of which is secured a sleeve 24. Similarly flange 22 is provided with a centrally disposed aperture 25 to the interior periphery of which is secured a sleeve 26 of an external diameter substantially equal to the internal diameter of sleeve 24. Thus when the spool 20 is assembled in the manner shown in Figure 4, sleeve 26 fits tightly within sleeve 24 and combined sleeves form a hub upon which a roll of film may be wound. It may here be pointed out that sleeve 24 is of slightly less length than sleeve 26, as shown in Figure 4, in order that the flanges 21 and 22 may be fitted snuggly against a roll of film to preclude any possibility of the penetration of light between the edges of the film and flanges 21 and 22. The interior of sleeve 26 is, of course, cylindrical. Thus a bore is provided by apertures 23 and 25 and the interior of sleeve 26 extending through spool 20.

Now from the foregoing it will be seen that in the preparation of the device for use sensitized film is wound about the hub formed by sleeves 24 and 26. Flanges 21 and 22 are adjusted to conform to the width of the film and spool 20 is positioned within sleeve 14 of the container. The end of the film is then drawn through slots 15 and 17 and the remaining portion of the container, comprised of sleeve 13 and end portion 11 is positioned over sleeve 14, slot 16 being suitably aligned with slot 17. The end of the film may then be secured to the outside of the container in any desired manner and the spool and container are ready for use in a suitable photographic mechanism without the necessity of exposing the film to light at any further time. In operation the container is simply inserted in the photographic mechanism on a suitable axle or shaft which passes through aperture 18 and the bore of sleeve 26. Thus spool 20 is free to rotate about such shaft and flat portion 19 maintains the container in fixed position with respect thereto. A similar container and film may, of course, be provided to take up the film when it is utilized, and when the film has been completely used the second container and the film and film spool contained therein may simply be removed from the photographic mechanism without the necessity of exposure to light. When it is then desired to remove the film from the container after it has been transported to a suitable dark room, the cap portion comprised of sleeve 13 and end member 11 is simply removed from sleeve 14 and spool 20 then removed from the container. By simply pulling end flanges 21 and 22 apart the film is delivered in rolled condition ready for development. When it is desired to reutilize the device, spool 20 is reassembled in the manner previously described, a new film wound thereon and the spool reinserted in the container.

Now from the foregoing it will be seen that there is herein provided a structure accomplishing all the objects of this invention including many advantages of great practical utility.

As many embodiments may be made of this invention and as many modifications may be made of the embodiment herein described and shown, it is to be understood that all matter hereinbefore set forth or shown in the accompanying drawing is to be interpreted merely as illustrative and not in a limiting sense.

I claim as my invention:

1. In a spool for film, in combination, a pair of end portions, each having an aperture therein, a sleeve secured to the interior periphery of each of said apertures, the external diameter of one of said sleeves being substantially equal to the internal diameter of the other of said sleeves whereby said sleeves may be telescoped to provide a tight frictional assembly of said spool.

2. In a spool for film, in combination, a pair of end flanges, each having an aperture therein, a sleeve secured to the interior periphery of each of said apertures, the external diameter of one of said sleeves being substantially equal to the internal diameter of the other of said sleeves whereby said sleeves may be telescoped to provide a tight frictional assembly of said spool, said sleeve of larger diameter being shorter than said sleeve of smaller diameter to permit adjustment of the width of said spool.

3. The combination of a spool for films comprising a pair of members secured to end flanges telescopically assembled to form a hub, means forming substantially cylindrical apertures in said end portions and said hub, a container having an end portion and means forming an irregular aperture in said end portion, whereby upon mounting said container and said spool on an irregular shaft, said spool may revolve about said shaft in said container, the latter remaining stationary.

4. The combination of a spool for films, said spool having a hub and a substantially cylindrical bore extending through said hub, a container comprising end portions and telescoping sleeves secured to said end portions, and means forming an irregular aperture in one of said end portions whereby upon mounting said container and said spool on an irregular shaft, said spool may revolve about said shaft in said container, the latter remaining stationary.

5. The combination of a spool for films comprising a pair of members secured to end flanges to form a hub, means forming a substantially cylindrical bore through said hub and said end portions, a container comprising end portions and telescopic sleeves secured to said last mentioned end portions, and means forming an irregular aperture in one of said end portions whereby upon mounting said container and said spool on an irregular shaft, said spool may revolve about said shaft in said container, the latter remaining stationary.

6. The combination of a spool for films comprising a pair of members secured to end flanges to form a hub, means forming a substantially cylindrical bore through said hub and said end portions, a container comprising end portions and telescopic sleeves secured to said end portions, means forming an irregular aperture in one of said end portions whereby upon mounting said container and said spool on an irregular shaft, said spool may revolve about said shaft in said container, the latter remaining stationary, and means forming a slot in said container to permit said film to be passed therethrough.

FREDRICK D. CLARKE.